(12) United States Patent
Wenderoth et al.

(10) Patent No.: US 7,704,406 B2
(45) Date of Patent: Apr. 27, 2010

(54) GLYCOL-FREE AQUEOUS ANTIFREEZE COMPOSITIONS COMPRISING DICARBOXYLIC ACID SALTS

(75) Inventors: Bernd Wenderoth, Birkenau (DE); Monica Fernandez Gonzalez, Heidelberg (DE); Stefan Dambach, Haßloch (DE); Ludwina Machetanz, Ludwigshafen (DE); Uwe Nitzschke, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 12/182,071

(22) Filed: Jul. 29, 2008

(65) Prior Publication Data

US 2008/0283795 A1    Nov. 20, 2008

Related U.S. Application Data

(62) Division of application No. 10/522,541, filed as application No. PCT/EP2003/008561 on Aug. 1, 2003.

(30) Foreign Application Priority Data

Aug. 2, 2002    (DE) ................. 10235477

(51) Int. Cl.
*C09K 5/00*    (2006.01)
(52) U.S. Cl. .................... 252/71; 252/72; 252/73; 252/74; 252/75; 252/76
(58) Field of Classification Search .............. None
See application file for complete search history.

(56) References Cited

U.S. PATENT DOCUMENTS

| | | | |
|---|---|---|---|
| 2,233,185 A | 2/1941 | Smith | |
| 4,448,702 A | 5/1984 | Kaes | |
| 5,104,562 A | 4/1992 | Kardos et al. | |
| 6,059,996 A | 5/2000 | Minks et al. | |
| 6,723,254 B1 | 4/2004 | Starzmann | |

FOREIGN PATENT DOCUMENTS

| | | |
|---|---|---|
| DE | 41 07 442 A1 | 9/1992 |
| DE | 195 10 012 A1 | 9/1996 |
| EP | 0 077 767 | 4/1983 |
| EP | 0 306 972 | 3/1989 |
| EP | 1170347 | 4/2001 |
| EP | 1 170 347 A2 | 1/2002 |
| GB | 1004259 | 9/1965 |
| JP | 2002-30281 | 1/2002 |
| WO | WO 96/26990 | 9/1996 |
| WO | WO 99/09108 | 2/1999 |
| WO | WO 99/37733 | 7/1999 |
| WO | WO 01/05906 A1 | 1/2001 |
| WO | WO 01/94494 A1 | 12/2001 |

OTHER PUBLICATIONS

SU 1726489-A1, Urals Kirov Poly (Urals Chem Inst.), Apr. 15, 1992, Abstract.
International Search Report PCT/EP 03/08561 (Dec. 29, 2003).

*Primary Examiner*—Necholus Ogden, Jr.
(74) *Attorney, Agent, or Firm*—Nixon & Vanderhye P.C.

(57) ABSTRACT

The present invention relates to an aqueous antifreeze composition comprising 10 to 50% by weight of one or more dicarboxylic acids, preferably aliphatic dicarboxylic acids having 4 to 12 carbon atoms in the form of the alkali metal, ammonium or alkaline earth metal salt. Preferably, these salts are used in combination with at least one further substance.

This gives antifreeze compositions with a good frost protective action, good heat conductivity and good protection against corrosion.

7 Claims, No Drawings

GLYCOL-FREE AQUEOUS ANTIFREEZE COMPOSITIONS COMPRISING DICARBOXYLIC ACID SALTS

This application is a divisional of commonly owned copending U.S. application Ser. No. 10/522,541 filed on Jan. 27, 2005, which is the national phase application under 35 USC §371 of PCT/EP2003/008561, filed Aug. 1, 2003 and claims the benefit of priority from DE 10235477.4 filed Aug. 2, 2002, the entire content of which is hereby incorporated by reference.

This present invention relates to aqueous antifreeze compositions based on dicarboxylic acid salts. These are suitable for use as radiator antifreezes in combustion engines, for example in motor vehicles, as heat-transfer liquids, for example in solar plants, or as cooling brines, for example in stationary cooling refrigeration plants.

Antifreeze compositions for the cooling cycles of combustion engines of, for example, automobiles, in most cases comprise alkylene glycols, primarily ethylene glycol and/or propylene glycol, as antifreeze component. In addition to other components, corrosion inhibitors, in particular, are also present.

Particularly in modern combustion engines, thermal stresses are reached which place high requirements on the materials used. Every type and any degree of corrosion represent a potential risk factor which can lead to a shortening of the service life of the engine and to a reduction in reliability. In addition, in modern engines, a large number of different materials is increasingly used, for example cast iron, cooper, brass, soft solder, steel and also magnesium and aluminum alloys. This large number of metallic materials additionally gives rise to potential corrosion problems, particularly at points where different metals are in contact with one another. At these points in particular it is comparatively easy for a very wide variety of different types of corrosion to arise, for example pitting corrosion, crevice corrosion, erosion or cavitation.

The corrosion protection achieved using the mixtures known to date, and also the freezing points which can be achieved are generally good. Mixtures of water with alkylene glycols, however, have a poorer heat conductivity than water. For this reason, attempts have already long been made to develop a glycol-free aqueous coolant formulation, for which the addition of salts reduces the freezing point. Numerous patents and patent applications already exist which propose solutions to this problem.

U.S. Pat. No. 2,233,185 describes glycol-free aqueous radiator antifreezes which contain sodium and potassium salts of so-called "fatty acids" having not more than 9 carbon atoms, for example potassium formate, acetate and/or propionate for reducing the freezing point.

EP-A 0 306 972 and its equivalent U.S. Pat. No. 5,104,562 describe partially or completely glycol-free, frost-resistant aqueous radiator antifreezes which comprise potassium formate and acetate for reducing the freezing point.

DE-A 41 07 442 describes glycol-free aqueous alkali metal salt solutions based on acetate/carbonate mixtures as heat-transfer compositions and coolants.

DE-A 195 10 012 discloses aqueous cooling liquids based on propionic acid salts.

WO 96/26990 describes frost-resistant coolants and heat-transfer liquids which comprise mixtures of potassium acetate and formate in addition to corrosion inhibitors as main components.

EP-A 1 007 600 discloses cooling brines based on alkali metal acetates and/or formates which, in addition to the customary corrosion inhibitors, additionally comprise alkali metal sulfites.

WO 99/37733 describes glycol-free aqueous cooling liquids with corrosion inhibitors which comprise alkali metal salts of acetic acid and/or formic acid as antifreeze component.

WO 01/94494 describes aqueous cooling liquids with improved heat-transfer properties based on cesium formate.

WO 01/05906 discloses aqueous formulations for use as radiator antifreezes and heat-transfer liquids comprising, in addition to corrosion inhibitors, a mixture of $C_1$-$C_2$-carboxylic acid salts, $C_3$-$C_5$-carboxylic acid salts and optionally $C_6$-$C_{12}$-carboxylic acid salts. The use of dicarboxylic acid salts is not disclosed.

EP-A 0 077 767 describes aqueous antifreeze compositions and deicers, in particular for the deicing of iced surfaces of roads and paths. The compositions comprise, in addition to optional further components which lower the freezing point, water-soluble salts of one or more dicarboxylic acids having at least three carbon atoms, e.g. mixtures of adipic, glutaric and succinic acid salts. The formulations are said to be sometimes useful also for transferring heat and cold in, for example, condensers, radiators and heat exchangers in industry, commercially and domestically at temperatures of from −20 to +100° C. The dicarboxylic acid salts described in EP-A 0 077 767 are also suitable in the concentration ranges which are necessary for achieving an adequate antifreeze effect, hut they are generally not used in coolants or antifreeze compositions due to the corrosive effect.

Hitherto, no glycol-free coolant or antifreeze composition has been successful in practice despite frequently better heat-transfer properties. This is due, in particular, to the inadequate corrosion protection, particularly in the case of modern engines, despite otherwise satisfactory properties with regard to lowering the freezing point. For example, the often proposed formates and acetates are in practice extremely corrosive. There is therefore a need for a glycol-free coolant with at least comparable corrosion protection as the known glycol-containing formulations.

It is an object of the present invention to provide such antifreeze compositions/coolants which do not have the disadvantages of the prior art. These mixtures should have a balanced relationship of the properties corrosion protection, heat transfer and frost resistance. In particular, an improved heat conductivity compared with the glycol-containing antifreeze compositions known hitherto should result.

We have found that this object is achieved by an aqueous antifreeze composition comprising 10 to 50% by weight of one or more salts from the group of saturated and unsaturated, aliphatic and aromatic dicarboxylic acids in the form of the alkali metal, ammonium or alkaline earth metal salt, further comprising one or more customary corrosion-inhibiting substances used in aqueous coolants.

We have found that this object is also achieved through the use as antifreeze composition of a salt of a dicarboxylic acid from the group of saturated and unsaturated, aliphatic and aromatic dicarboxylic acids in the form of the alkali metal, ammonium or alkaline earth metal salt, in combination with one or more customary corrosion-inhibiting substance used in aqueous coolants.

It is in particular advantageous to use the said combination in cooling liquids, heat transfer liquids or cooling brines.

By combining customary corrosion-inhibiting agents with dicarboxylic acid salts, which, in relatively high concentrations, otherwise have a very corrosive action, their corrosive effect is surprisingly suppressed. In this combination, dicarboxylic acid salts lend themselves as antifreeze composition. This way is not only a good protection against freezing with an ice flocculation point according to ASTM D 1177 of less than −30° C. achieved in the antifreeze compositions according to the invention, but also excellent heat conductivity combined with very good corrosion protection.

Examples of aromatic dicarboxylic acids include phthalic acid and terephthalic acid.

Preference is given to using the salts of unbranched or branched, saturated or unsaturated aliphatic dicarboxylic acids having 2 to 15 carbon atoms or mixtures thereof. Acids of this class suitable according to the invention include oxalic acid, malonic acid, succinic acid, glutaric acid, adipic acid, pimelic acid, suberic acid, azelaic acid, sebacic acid, undecanedioic acid, dodecanedioic acid, maleic acid, fumaric acid, sorbic acid. Mixtures of carboxylic acids which are produced industrially, as are marketed, for example, under the name Sokalan® DCS($C_4$-$C_6$-dicarboxylic acids) from BASF AG, can also be used according to the invention.

In particular, linear saturated, aliphatic dicarboxylic acids having 4 to 12 carbon atoms or mixtures thereof are used, an example of which being Sokalan® DCS. The use of salts of adipic acid is most preferred.

All of the abovementioned carboxylic acids are present in the antifreeze compositions according to the invention in the form of an alkali metal salt, preferably a sodium or potassium salt, or in the form of an ammonium salt or substituted ammonium salt, for example in the form of ammonia, trialkylamines or trialkanolamines. The salts are usually in the form of the bis salts, but can also be in the form of monosalts of the dicarboxylic acids, or of mixtures of bis- and monosalts.

In a preferred embodiment of the present invention, the corrosion-inhibiting substance used is one or more compounds from the groups listed below.
a) 0.01 to 5% by weight of one more compounds from the group of aliphatic and aromatic monocarboxylic acids having 3 to 16 carbon atoms in the form of their alkali metal, ammonium and substituted ammonium salts;
b) 0.01 to 5% by weight of one or more compounds from the group of aliphatic and aromatic di- and tricarboxylic acids each having 3 to 21 carbon atoms in the form of their alkali metal, ammonium and substituted ammonium salts, where, in cases where a dicarboxylic acid is used, this is different from the dicarboxylic acid used as antifreeze composition;
c) 0 to 1% by weight of one or more compounds from the group of alkali metal borates, alkali metal phosphates, alkali metal silicates, alkali metal nitrites, alkali metal and alkaline earth metal nitrates, molybdates and alkali metal and alkaline earth metal fluorides;
d) 0 to 1% by weight of one or more compounds from the group of hard-water stabilizers based on polyacrylic acid, polymaleic acid, acrylic acid-maleic acid copolymers, polyvinylpyrrolidone, polyvinylimidazole, vinylpyrrolidone-vinylimidazole copolymers and copolymers of unsaturated carboxylic acids and olefins;
e) 0.01 to 5% by weight of one or more compounds from the group of carboxamides and sulfonamides;
f) 0.01 to 5% by weight of one or more compounds from the group of mono- and binuclear unsaturated and partially unsaturated heterocycles having 4 to 10 carbon atoms, which may be benzo-fused or carry additional functional groups,
g) 0.01 to 5% by weight of one or more compounds from the group of tetra($C_1$-$C_8$-alkoxy)silanes (orthosilicic acid tetra-$C_1$-$C_8$-alkyl esters);
h) 0.01 to 5% by weight of one or more compounds from the group of aliphatic, cycloaliphatic and aromatic amines having 2 to 15 carbon atoms which may additionally contain ether oxygen atoms or hydroxyl groups.

It is possible to use one or more compounds from each of the groups of substances a) to h) listed above. The substances additionally used can originate from one or more of the groups of substances a) to h).

Examples of linear, branched and cyclic aliphatic monocarboxylic acids of group a) include propionic acid, pentanoic acid, hexanoic acid, cyclohexylacetic acid, octanoic acid, 2-ethylhexanoic acid, nonanoic acid, isononanoic acid, decanoic acid, undecanoic acid and dodecanoic acid.

Examples of aromatic carboxylic acids of group a) include benzoic acid and substituted benzoic acid. Examples thereof include $C_1$-$C_8$-alkylbenzoic acid, in particular o-, m- and p-methylbenzoic acid and p-tert-butylbenzoic acid, and hydroxyl-containing aromatic monocarboxylic acids, in particular o-, m- and p-hydroxybenzoic acid and o-, m- and p-hydroxymethyl)benzoic acid and halobenzoic acids, in particular o-, m- and p-fluorobenzoic acid and benzoic acid substituted by nitro groups, in particular o-, m- and p-nitrobenzoic acid. The use of unsubstituted benzoic acid is preferred.

Examples of di- and tricarboxylic acids of group b) include malonic acid, succinic acid, glutaric acid, adipic acid, pimelic acid, suberic acid, azelaic acid, sebacic acid, undecanedioic acid, dodecanedioic acid, dicyclopentadienedicarboxylic acid, phthalic acid, terephthalic acid and triazinetriiminocarboxylic acids, for example 6,6',6"-(1,3,5-triazine-2,4,6-triyltriimino)trihexanoic acid.

The carboxylic acids specified above under a) and b) are in the form of alkali metal salts, preferably sodium or potassium salts, or ammonium or substituted ammonium salts (amine salts), for example of ammonia, trialkylamines or alkanolamines. Corresponding imides of the dicarboxylic acids can also be used.

Examples of compounds specified under c) are sodium tetraborate (borax), disodium hydrogenphosphate, trisodium phosphate, sodium metasilicate, sodium nitrite, sodium nitrate, magnesium nitrate, sodium fluoride, potassium fluoride, magnesium fluoride and sodium molybdate. Said compounds have corrosion-inhibiting properties. If alkali metal silicates are co-used, these are expediently stabilized by customary organosilicophosphonates or organosilicosulfonates in customary amounts.

In addition to said inhibitor components, additives, for example soluble salts of magnesium of organic acids, for example magnesium benzenesulfonate, magnesium methanesulfonate, magnesium acetate or magnesium propionate, hydrocarbazoles or quaternized imidazoles, as are described in DE-A 196 05 509, can, for example, also be used in customary amounts. Sulfites as are disclosed in EP-A 1 007 600 can also be used.

Examples of carboxamides and sulfonamides of group e) include aliphatic, cycloaliphatic, aromatic and heteroaromatic carboxamides and sulfonamides each having 2 to 16 carbon atoms, preferably each having 3 to 12 carbon atoms.

Examples of the abovementioned carboxamides and sulfonamides are listed below:

Benzamide, 2-methylbenzamide, 3-methylbenzamide, 4-methylbenzamide, 2,4-dimethylbenzamide, 4-tert-butylbenzamide, 3-methoxybenzamide, 4-methoxybenzamide, 2-aminobenzamide (anthranilamide), 3-aminobenzamide, 4-aminobenzamide, 3-amino-4-methylbenzamide, 2-chlorobenzamide, 3-chlorobenzamide, 4-chlorobenzamide, 2-fluorobenzamide, 3-fluorobenzamide, 4-fluorobenzamide, 2,6-difluorobenzamide, 4-hydroxybenzamide, 2-hydroxybenzamide, (salicylamide), phthaldiamide, terephthaldiamide, nicotinamide (pyridine-3-carboxamide), picolinamide (pyridine-2-carboxamide), succinamide, adipamide, propionamide, hexanamide, 2-pyrrolidone, N-methyl-2-pyrrolidone, 2-piperidone, ε-caprolactam, benzenesulfonamide, o-toluenesulfonamide, m-toluenesulfonamide, p-toluenesulfonamide, 4-tert-butylbenzenesulfonamide, 4-fluorobenzenesulfonamide, 4-hydroxybenzene-sulfonamide, 2-aminobenzenesulfonamide, 3-aminobenzenesulfonamide, 4-aminobenzenesulfonamide, 4-acetylbenzenesulfonamide.

The amides of group e) can optionally be alkyl-substituted on the nitrogen atom of the amide group, for example by a $C_1$-$C_4$-alkyl group. Aromatic or heteroaromatic basic structures of the molecule can obviously also carry such alkyl groups. In the molecule, one or more, preferably one or two, amide groups may be present. The amides can additionally have functional groups, preferably from the group $C_1$-$C_4$-alkoxy, amino, fluorine, chlorine, hydroxyl and acetyl. The abovementioned functional groups are present in particular as substituents on different aromatic and heteroaromatic rings.

Examples of heterocycles of group f) include mononuclear five- and six-membered systems having 1, 2 or 3 nitrogen atoms or having one nitrogen atom and one sulfur atom, where said systems may be benzo-fused. It is also possible to use binuclear systems of five- or six-membered part rings typically having 2, 3 or 4 nitrogen atoms. The heterocycles f) can carry additional functional groups, preferably from the group consisting of $C_1$-$C_4$-alkoxy, amino and mercapto. The heterocyclic basic structure can of course be substituted by alkyl groups.

Preferred heterocycles f) include benzotriazole, tolutriazole, hydrogenated tolutriazole, 1H-1,2,4-triazole, benzimidazole, benzthiazole, adenine, purine, 6-methoxypurine, indole, isoindole, isoindoline, pyridine, pyrimidine, 3,4-diaminopyridine, 2-aminopyrimidine and 2-mercaptopyrimidine.

Examples of tetra($C_1$-$C_8$-alkoxy)silanes of group g) include tetramethoxysilane, tetraethoxysilane, tetra-n-propoxysilane or tetra-n-butoxysilane.

Examples of aliphatic, cycloaliphatic and aromatic amines of group h) having 2 to 15 carbon atoms, which may additionally contain ether oxygen atoms or hydroxyl groups, include ethylamine, propylamine, isopropylamine, n-butylamine, isobutylamine, sec-butylamine, tert-butylamine, n-pentylamine, n-hexylamine, n-heptylamine, n-octylamine, isononylamine, di-n-propylamine, diisopropylamine, di-n-butylamine, mono-, di- and triethanolamine, piperidine, morpholine, aniline and benzylamine. Aliphatic and cycloaliphatic amines h) are preferably saturated. Preference is given to the use of amines having 4 to 8 carbon atoms.

The pH of the antifreeze compositions according to the invention is usually in the range from 6 to 11, preferably 6 to 10, in particular 7 to 9.5. In this connection, the desired pH can, where appropriate, be established also by adding alkali metal hydroxide, ammonia or amines to the formulation, solid sodium hydroxide or potassium hydroxide and also aqueous sodium hydroxide or potassium hydroxide solutions being particularly suitable for this purpose. Carboxylic acids to be used concomitantly are expediently added at the same time as the corresponding alkali metal salts in order that they are automatically in the desired pH range. It is however, also possible to add the carboxylic acids as free acids and then to neutralize with alkali metal hydroxide, ammonia or amines, and establish the desired pH range.

In general, the antifreeze compositions according to the invention do not comprise any glycol.

In one embodiment, the aqueous antifreeze compositions according to the invention also comprise small amounts, in particular less than 10% by weight, of ethylene glycol or propylene glycol or mixtures of alkylene glycols or of glycerol with ethylene glycol or propylene glycol. For the purposes of the present invention, "propylene glycol" is understood as meaning both 1,2-propylene glycol and also 1,3-propylene glycol.

In a further embodiment, the aqueous antifreeze compositions according to the invention may also comprise small amounts, less than 10% by weight and in particular less than 5.5% by weight, of polyethylene glycols and/or polypropylene glycols having 2 to 15 glycol ether units, such as, for example, diethylene glycol, triethylene glycol, tetraethylene glycol, dipropylene glycol, tripropylene glycol and tetrapropylene glycol. Corresponding water-soluble alkylene glycol or polyalkylene glycol ethers may also be present in the given amounts, such as, for example, triethylene glycol monomethyl ether.

As further customary auxiliaries, the antifreeze compositions according to the invention can comprise, in customary low amounts, also antifoam, generally in amounts of from 0.001 to 0.010% by weight, individual or two or more dyes, and bitter substances for reasons of hygiene and safety in the case of swallowing. One example of a suitable bitter substance is denatonium benzoate. The dyes mentioned are preferably chosen from the group consisting of C.I. Direct Blue 199 (C.I. 74190), C.I. Direct Blue 86 (C.I. 74180), C.I. Acid Green 25 (C.I. 61570), C.I. Acid Yellow 73 (C.I. 45350), C.I. Reactive Violet 5 (C.I. 18097) and Uranine (sodium fluorescein) and mixtures thereof.

The formulations according to the invention can also additionally comprise one or more inorganic or organic substances which lower the freezing point, for example formates, acetates and/or propionates, as are known from the prior art. In principle, mixtures with glycol-free and glycol- or glycerol-containing radiator antifreezes are also possible.

The aqueous antifreeze compositions according to the invention have primarily a considerably better corrosion inhibition compared with the compositions known from the prior art. This action is particularly good for the combination of the dicarboxylic acid salts according to the invention with one or more substances from the groups a) to h). Even more preferred is the combination of one or more substances from the groups a), b), c), d) and/or f). Particular preference is given to the use of salts of 2-ethylhexanoic acid, p-hydroxybenzoic acid, benzoic acid, isononanoic acid, sebacic acid or dodecanedicarboxylic acid, and of tolutriazole, benzotriazole, 1H-1,2,4-triazole, sodium molybdate and sodium metasilicate.

The aqueous solutions based on dicarboxylic acid salts are suitable for use as radiator antifreezes for combustion engines, for example in motor vehicles or ships. In addition, they are suitable as heat-transfer liquids, for example for the operation of solar plants, for example of private or public buildings for obtaining hot water or as cooling brines, for example in stationary cooling plants such as, for example, in cold or frozen storage depots for storing foods, the use as radiator coolant for combustion engines being preferred.

The examples below serve to illustrate the invention without limiting it.

EXAMPLES

The novel aqueous radiator antifreezes according to the invention can in principle be prepared by simply mixing and dissolving the feed substances in water, which is described below by way of example for example 1:

Example 1

Quantitative Ratios of the Feed Substances According to Table 1

Distilled water is firstly admixed with adipic acid and, by adding 50% strength KOH, dissolved with stirring. To this solution is then added a second solution which has been prepared beforehand from distilled water, 50% strength KOH, dodecanedicarboxylic acid and sodium metasilicate× 5H$_2$O/sodium silicophosphonate mixture. To this is then also added 2-ethylhexanoic acid, 4-hydroxybenzoic acid, benzotriazole and tolutriazole, giving a clear solution with a pH of 9.

Table 1 lists the feed substances of examples 1 to 4 according to the invention.

Tables 2 and 3 show corrosion results of the formulations according to the invention and comparative examples 1 and 2 in the Glassware Corrosion Test in accordance with ASTM D 1384-97 and in the Static Hot Corrosion Test in accordance with ASTM D 4340.

As can be seen, the novel aqueous radiator antifreezes according to the invention achieve very good freezing protection (ice flocculation points see table 2) coupled with excellent corrosion protection for a very wide variety of metal alloys, which overall is significantly better than the prior art hitherto for glycol-free coolants.

TABLE 1

| Feed substances [% by wt.] | Example 1 | Example 2 | Example 3 | Example 4 | Example 5 |
|---|---|---|---|---|---|
| Adipic acid | 27.45 | 24.00 | 24.00 |  | 27.45 |
| Sokalan ®DCS |  |  |  | 27.00 |  |
| H$_2$O | 27.06 | 26.14 | 33.19 | 28.46 | 23.56 |
| KOH, 50% in H$_2$O | 44.44 | 41.74 | 39.00 | 43.04 | 44.44 |
| Tripropylene glycol |  |  |  |  | 3.50 |
| 2-Ethylhexanoic acid | 0.58 | 3.50 | 1.00 | 0.58 | 0.58 |
| p-Hydroxybenzoic acid | 0.21 |  |  |  | 0.21 |
| Benzoic acid |  |  |  | 0.21 |  |
| Dodecanedicarboxylic acid | 0.03 |  |  | 0.03 | 0.03 |
| Tolutriazole | 0.05 | 2.42 | 0.50 | 0.50 | 0.05 |
| Benzotriazole | 0.05 |  |  | 0.05 | 0.05 |
| Sodium molybdate × 2H$_2$O |  | 2.20 | 2.20 |  |  |
| Sodium metasilicate × 5H$_2$O | 0.11 |  | 0.10 | 0.11 | 0.11 |
| Sodium silicophosphonate | 0.02 |  | 0.01 | 0.02 | 0.02 |

TABLE 2

| Glassware Corrosion Test in accordance with ASTM D 1384-97 Coolant protectant tested (concentration: 100% by volume) | | | | | | | |
|---|---|---|---|---|---|---|---|
|  | Ex. 1 | Ex. 2 | Ex. 3 | Ex. 4 | Ex. 5 | Comparison 1 (WO 01/05906, Ex. 2) | Comparison 2 (EP 0 077 767, Ex. 1) |
| Ice flocculation points [° C.] acc. to ASTM D 1177: | | | | | | | |
|  | −37 | −35 | −30 | <−35 | <−35 | −25 to −34 | <−35 |
| Weight changes: | | | | | | | |
| Test bodies | [mg/cm$^2$] | [mg/cm$^2$] | [mg/cm$^2$] | [mg/cm$^2$] | [mg/cm$^2$] | [mg/cm$^2$] | [mg/cm$^2$] |
| Copper | −0.09 | −0.15 | 0.01 | −0.12 | −0.04 | −0.16 | +0.15 |
| Soft solder | 0.03 | 0.01 | 0.02 | −0.23 | −0.06 | −4.89 | −25.37 |
| Glass | −0.06 | −0.32 | 0.03 | −0.11 | 0.02 | −0.17 | +0.14 |
| Steel | 0.02 | 0.02 | 0.00 | 0.00 | 0.02 | 0.01 | −1.18 |
| Gray iron | 0.04 | 0.02 | 0.06 | 0.02 | −0.01 | −4.18 | −35.30 |
| Cast aluminum | 0.02 | 0.05 | −0.03 | −0.01 | 0.00 | −0.19 | −0.69 |
| Appearance of coolant after test: | clear | clear | clear | clear | clear | cloudy | very brown precipitations |

TABLE 3

Static hot corrosion test in accordance with ASTM D 4340-98

| | Weight changes: | | |
|---|---|---|---|
| Test bodies: | Example 1 [mg/cm²/week] | Example 2 [mg/cm²/week] | Example 5 [mg/²/week] |
| Cast aluminum | −0.28 | −0.19 | −0.13 |

Radiator antifreeze tested (concentration: 100% by volume):

The invention claimed is:

1. An aqueous antifreeze composition comprising 10 to 50% by weight of one or more salts from the group of saturated and unsaturated, aliphatic and aromatic dicarboxylic acids being adipic acid and dodecandicarboxylic acid in the form of the alkali metal, ammonium or alkaline earth metal salt, further comprising one or more corrosion-inhibiting substances for aqueous coolants, and
   (a) 0.01 to 5% by weight p-hydroxybenzoic acid and 2-ethylhexanoic acid in the form of alkali metal, ammonium and substituted ammonium salts thereof.

2. An antifreeze composition as claimed in claim 1, wherein the salt is a sodium or potassium salt, an ammonium, trialkylamine or trialkanolamine salt.

3. An antifreeze composition as claimed in claim 1, which further comprises one or more compounds from the groups listed below
   b) 0.01 to 5% by weight of one or more compounds from the group of aliphatic and aromatic di- and tricarboxylic acids each having 3 to 21 carbon atoms other than those recited in claim 1 in the form of their alkali metal, ammonium and substituted ammonium salts, where, in cases where a dicarboxylic acid is used, this is different from the dicarboxylic acid used as antifreeze composition.
   c) 0 to 1% by weight of one or more compounds from the group of alkali metal borates, alkali metal phosphates, alkali metal silicates, alkali metal nitrites, alkali metal and alkaline earth metal nitrates, molybdates and alkali metal and alkaline earth metal fluorides;
   d) 0 to 1 % by weight of one or more compounds from the group of hard-water stabilizers based on polyacrylic acid, polymaleic acid, acrylic acid-maleic acid copolymers, polyvinylpyrrolidone, polyvinylimidazole, vinylpyrrolidone-vinylimidazole copolymers and copolymers of unsaturated carboxylic acids and olefins;
   e) 0.01 to 5% by weight of one or more compounds from the group of carboxamides and sulfonamides;
   f) 0.01 to 5% by weight of one or more compounds from the group of mono- and binuclear unsaturated and partially unsaturated heterocycles having 4 to 10 carbon atoms, which may be benzo-fused or carry additional functional groups,
   g) 0.01 to 5% by weight of one or more compounds from the group of tetra($C_1$-$C_8$-alkoxy)silanes (orthosilicic acid tetra-$C_1$-$C_8$-alkyl esters); and
   h) 0.01 to 5% by weight of one or more compounds from the group of aliphatic, cycloaliphatic and aromatic amines having 2 to 15 carbon atoms which may additionally contain ether oxygen atoms or hydroxyl groups.

4. An antifreeze composition as claimed in claim 3, wherein the combination of one or more substances from the groups b), c), d) and/or f) is present.

5. An antifreeze composition as claimed in claim 4, wherein a combination of one or more substances from groups b), c) and f) is present, and wherein
   b) is sebacic acid or dodecanedicarboxylic acid,
   c) is sodium molybdate or sodium metasilicate, and
   f) is tolutriazole, benzotriazole of 1H-1,2,4-triazole.

6. An antifreeze composition as claimed in claim 1, wherein their pH is in the range from 6 to 11.

7. An antifreeze composition as claimed in claim 1, which comprises less than 10% by weight of ethylene glycol, propylene glycol, polyethylene glycols and/or polypropylene glycols having 2 to 15 glycol ether units.

* * * * *